UNITED STATES PATENT OFFICE.

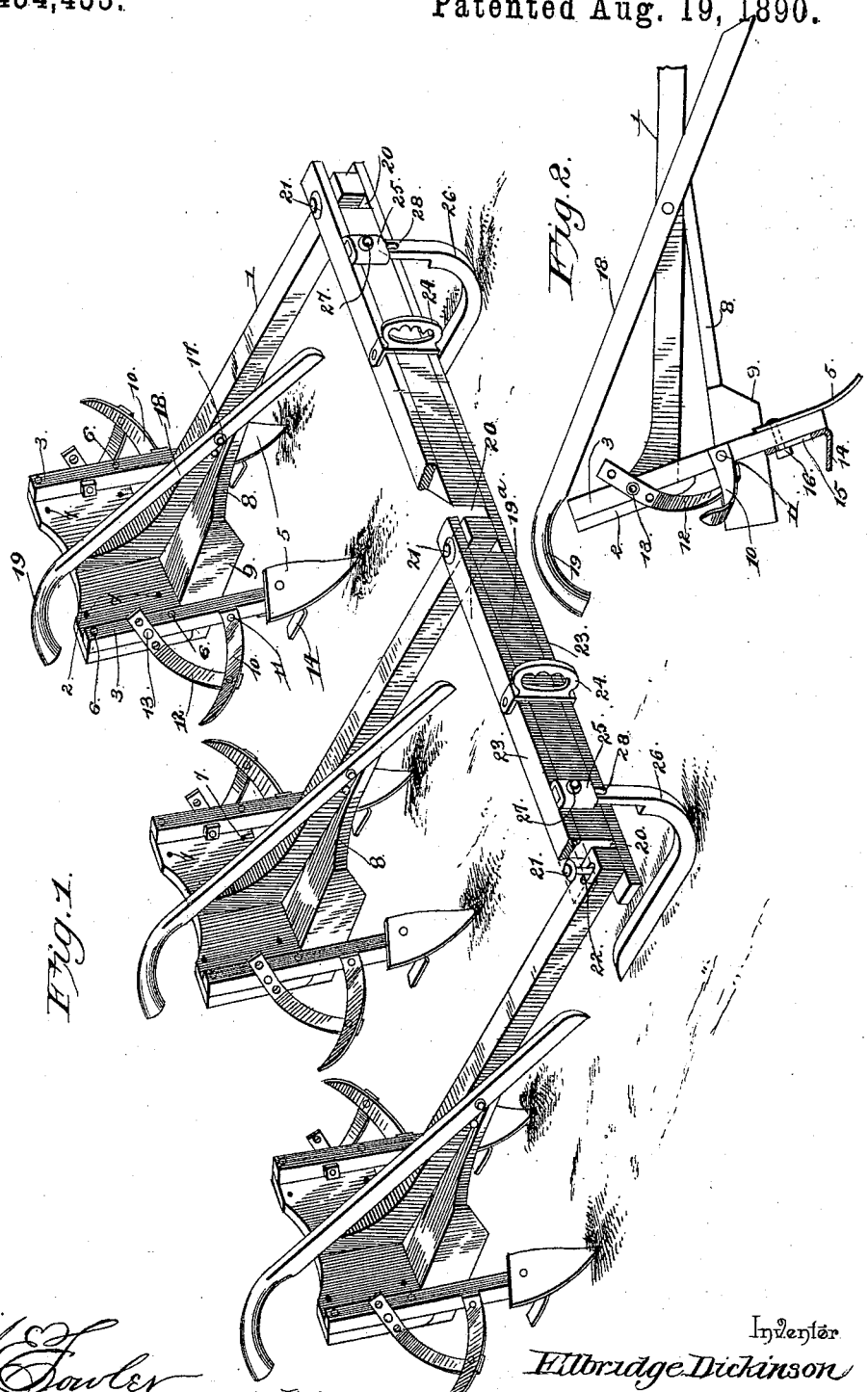

ELBRIDGE DICKINSON, OF EMPORIA, KANSAS.

CULTIVATOR.

SPECIFICATION forming part of Letters Patent No. 434,433, dated August 19, 1890.

Application filed September 11, 1889. Serial No. 323,628. (No model.)

*To all whom it may concern:*

Be it known that I, ELBRIDGE DICKINSON, a citizen of the United States, residing at Emporia, in the county of Lyon and State of Kansas, have invented a new and useful Cultivator, of which the following is a specification.

This invention has relation to cultivators of that class designed to cultivate listed corn;
and the objects and advantages of the same will hereinafter appear, and be particularly pointed out in the claims.

Referring to the drawings, Figure 1 is a perspective of a gang of cultivators constructed in accordance with my invention. Fig. 2 is a side elevation in detail of the rear portion of one of the cultivators.

In practicing my invention I prefer to employ a gang of three cultivators, each of which is a counterpart of the other, and a description therefore of one will suffice.

1 represents the beam, to the rear end of which is connected a back board 2, having at its opposite sides depending standards 3, terminating in cultivator-shares 5. One corner of each share—the outer corner—is formed a little higher than the other to partake so far as possible of the contour of the furrow. The standards 4 are bolted to the back piece 2, which is inclined by means of bolts 6. A series of bolt-holes 7 is provided in the back piece near each side, so that the standards may be adjusted for wider or narrower furrows.

Bolted to about the center of the beam 1, and extending to the rear under the same, is a shield-beam 8, which extends to the rear of the board 2 and is provided with opposite flanges 9. The shield forms an arch over the small corn and protects the same against the shovels or shares as the cultivator moves along.

To the lower and outer face of each of the standards is mounted an outwardly-extending and upwardly-projecting scraper-blade 10, the object of the same being to shave the weeds from the sides of the furrows. The front ends of these blades terminate in bends or feet, and through the same is inserted a pivot-bolt 11, by which means the scraper may be raised or lowered. An adjusting-strap 12 connects the rear part of said blades to the sides of the standards, and by a bolt 13 serves to adjust the scraper in any of its inclinations, said strap being perforated at intervals for this purpose.

To the rear sides of each of the standards and near their lower ends are bolted L-shaped feet 14, the shank of the L being slotted, as at 15, and vertically adjustable by means of a bolt 16, mounted in the slot and taking into the standard, whereby the depth of penetration of the shares or shovels may be regulated, said feet sliding along on the hard dirt just behind the shovel and serving to support to a material extent the weight of the cultivator.

Bolted, by means of a bolt 17, to the side of the beam 1, is a lever 18, the handle of which 19 extends rearwardly and terminates over the back board 2. The length of the lever from its point of attachment to its outer end is greater than the distance from the shovel-points to the beam, and when said lever is thrown to a vertical position serves to elevate the cultivator, withdrawing the shovel-points from the ground, and in this manner the cultivator may be swung around at the end of a furrow.

19$^a$ represents a cross-bar, which is of a length to receive all of the gang or series of cultivators, and is provided with openings 20, having bolts 21, which pass through openings 22 in the forward ends of the beams, by which means each of said cultivators is independently pivoted to the doubletree. For the purpose of protecting the surface of the openings 20 a metal lining 23 is preferably provided. By this connection the beams of the cultivators may swing sidewise to accommodate themselves to the irregularities of the furrows and yet not be permitted to tip over upon their sides, as the openings are closed at top and bottom and are cut away at their opposite sides to provide for the lateral motion mentioned. Singletrees of the usual construction are connected to the doubletree intermediate the openings 20, for which purpose clevises 24 are provided. Sleeves 25 are provided at intervals upon the outer face of the doubletree, and adjustably mounted upon the same are L-shaped runners 26, the lower ends of which terminate under the doubletree. The adjustability of the runners is accomplished by means of the usual slot and bolts 27 and 28, respectively, and by this means the doubletree may be elevated at a suitable distance above the ground.

It will be noticed that by reason of the extreme simplicity, arrangement, and manner of assembling and connecting the several parts of each cultivator I obviate the employment of any openings liable to receive and catch stiff weeds, cornstalks, and other trash common in listed corn.

It will of course be understood that I do not limit my invention to use in gangs, but hold that I may use but a single cultivator, if desired.

Having described my invention, what I claim is—

1. The combination, with a beam provided at each of its sides with opposite shovels, of an inclined shield-beam connected thereto at its front end and depending therefrom and terminating in a shield between the shovels, substantially as specified.

2. In a cultivator, the combination, with the beam, of an inclined back board secured to the rear end of the beam and provided near each side with a vertically-opposite series of openings, and shovel-standards mounted on the board, and bolts for connecting the same to an opening of each series, whereby the standards may be maintained in parallelism and adjusted toward or from each other, substantially as specified.

3. In a cultivator, the combination, with a shovel-standard, of a laterally and upwardly curved inclined hill-scraper pivoted to said standard and means for adjusting the same, substantially as specified.

4. In a cultivator, the combination, with a beam having a back board and inclined shovel-standard at each side of the back board, of laterally and upwardly curved inclined hill-scrapers terminating in a foot pivoted to the standards, and a perforated adjusting-strap connecting the standards and scrapers, and a set bolt mounted in the strap and taking into the standards, substantially as specified.

In testimony that I claim the foregoing as my own I have hereto affixed my signature in presence of two witnesses.

ELBRIDGE DICKINSON.

Witnesses:
L. D. MYERS,
GEO. F. HALL.